(12) United States Patent
Maharjan et al.

(10) Patent No.: US 11,967,047 B2
(45) Date of Patent: Apr. 23, 2024

(54) METHODS AND DEVICES FOR JOINT SENSOR AND PIXEL DOMAIN DENOISING

(71) Applicant: KWAI INC., Palo Alto, CA (US)

(72) Inventors: Paras Maharjan, Kansas City, MO (US); Ning Xu, Irvine, CA (US); Xuan Xu, Palo Alto, CA (US); Yuyan Song, Palo Alto, CA (US)

(73) Assignee: KWAI INC., Palo Alto, CA (US)

( * ) Notice: Subject to any disclaimer, the term of this patent is extended or adjusted under 35 U.S.C. 154(b) by 398 days.

(21) Appl. No.: 17/491,508

(22) Filed: Sep. 30, 2021

(65) Prior Publication Data

US 2023/0109090 A1    Apr. 6, 2023

(51) Int. Cl.
*G06T 5/00* (2006.01)
*G06T 5/50* (2006.01)
*G06T 7/11* (2017.01)

(52) U.S. Cl.
CPC ............... *G06T 5/002* (2013.01); *G06T 5/50* (2013.01); *G06T 7/11* (2017.01); *G06T 2207/10024* (2013.01); *G06T 2207/20081* (2013.01); *G06T 2207/20084* (2013.01)

(58) Field of Classification Search
CPC ... G06T 5/002; G06T 7/11; G06T 5/50; G06T 2207/10024; G06T 2207/20081; G06T 2207/20084
See application file for complete search history.

(56) References Cited

U.S. PATENT DOCUMENTS

| 11,842,460 | B1* | 12/2023 | Chen | ....................... G06T 5/002 |
| 2019/0108618 | A1* | 4/2019 | Hwang | .................. G06T 3/4046 |
| 2020/0092453 | A1* | 3/2020 | Gordon | .................. G06V 10/82 |
| 2021/0241429 | A1* | 8/2021 | Pan | ....................... H04N 25/135 |
| 2023/0058096 | A1* | 2/2023 | Ferrés | ....................... G06T 7/40 |

OTHER PUBLICATIONS

Peng, Yali, et al. "Progressive training of multi-level wavelet residual networks for image denoising." arXiv preprint arXiv:2010.12422 (2020). (Year: 2020).*
Yu, Songhyun, Bumjun Park, and Jechang Jeong. "Deep iterative down-up cnn for image denoising." Proceedings of the IEEE/CVF conference on computer vision and pattern recognition workshops. 2019. (Year: 2019).*
Brooks, Tim, et al. "Unprocessing images for learned raw denoising." Proceedings of the IEEE/CVF Conference on Computer Vision and Pattern Recognition. 2019. (Year: 2019).*
Abdelhamed, Abdelrahman, Radu Timofte, and Michael S. Brown. "Ntire 2019 challenge on real image denoising: Methods and results." Proceedings of the IEEE/CVF Conference on Computer Vision and Pattern Recognition Workshops. 2019. (Year: 2019).*

* cited by examiner

*Primary Examiner* — Utpal D Shah
(74) *Attorney, Agent, or Firm* — Arch & Lake LLP

(57) ABSTRACT

A method, apparatus, and a non-transitory computer-readable storage medium for image denoising. The method may include obtaining a raw image captured by a camera. The method may also include obtaining a color modeled image based on the raw image. The method may further include obtaining a subsampled raw image based on the raw image. The method may also include obtaining a denoised image based on a neural network processing the color modeled image and the subsampled raw image.

21 Claims, 10 Drawing Sheets

(7 of 10 Drawing Sheet(s) Filed in Color)

— Adding 461
--→ Concatenation 462
▽ 3x3 Conv with stride of 2 463
⬆ Subpixel layer with scale of 2 464

▩ 3x3 Conv + PReLU 465
▩ Down-up Block (DUB) 466
▩ Reconstruction block 467
▩ 1x1 Conv 468

METHODS AND DEVICES FOR JOINT SENSOR AND PIXEL DOMAIN DENOISING

TECHNICAL FIELD

This disclosure is related to image processing. More specifically, this disclosure relates to methods and devices for image denoising.

BACKGROUND

Noise is unavoidable in camera system. When the camera's sensor data is processed by the image signal processor (ISP) this noise get further mixed and magnified. Different noise like shot noise, read noise and quantization noise are present in reconstructed red, green, blue (RGB) image which is difficult to denoise using traditional denoising methods. Traditional denoising methods like block-matching and 3D filtering (BM3D), weighted nuclear norm minimization (WNNM) generally works well with the Additive White Gaussian Noise (AWGN) but fails when used in real world noisy image. Additionally, these methods are not suitable for real-time application because of higher complexity of algorithm and longer inference time.

SUMMARY

Examples of the present disclosure provide methods and apparatus for image denoising.

According to a first aspect of the present disclosure, a method may include obtaining a raw image captured by a camera. The method may include obtaining a color modeled image based on the raw image. The method may also include obtaining a subsampled raw image based on the raw image. The method may further include obtaining a denoised image based on a neural network processing the color modeled image and the subsampled raw image.

According to a second aspect of the present disclosure, a computing device is provided. The computing device may include one or more processors coupled with a camera, a non-transitory computer-readable memory storing instructions executable by the one or more processors. The one or more processors may be configured to obtain a raw image captured by the camera. The one or more processors may further be configured to obtain a color modeled image based on the raw image. The one or more processors may further be configured to obtain a subsampled raw image based on the raw image. The one or more processors may further be configured to obtain a denoised image based on a neural network processing the color modeled image and the subsampled raw image.

According to a third aspect of the present disclosure, a non-transitory computer-readable storage medium having stored therein instructions is provided. When the instructions are executed by one or more processors of the apparatus, the instructions may cause the apparatus to obtain a raw image captured by a camera. The instructions may also cause the apparatus to obtain a color modeled image based on the raw image. The instructions may also cause the apparatus to obtain a subsampled raw image based on the raw image. The instructions may also cause the apparatus to obtain a denoised image based on a neural network processing the color modeled image and the subsampled raw image.

It is to be understood that both the foregoing general description and the following detailed description are examples only and are not restrictive of the present disclosure.

BRIEF DESCRIPTION OF THE DRAWINGS

The application file contains drawings executed in color. Copies of this patent application publication with color drawings will be provided by the Office upon request and payment of the necessary fee.

The accompanying drawings, which are incorporated in and constitute a part of this specification, illustrate examples consistent with the present disclosure and, together with the description, serve to explain the principles of the disclosure.

DETAILED DESCRIPTION

Figure 1A:
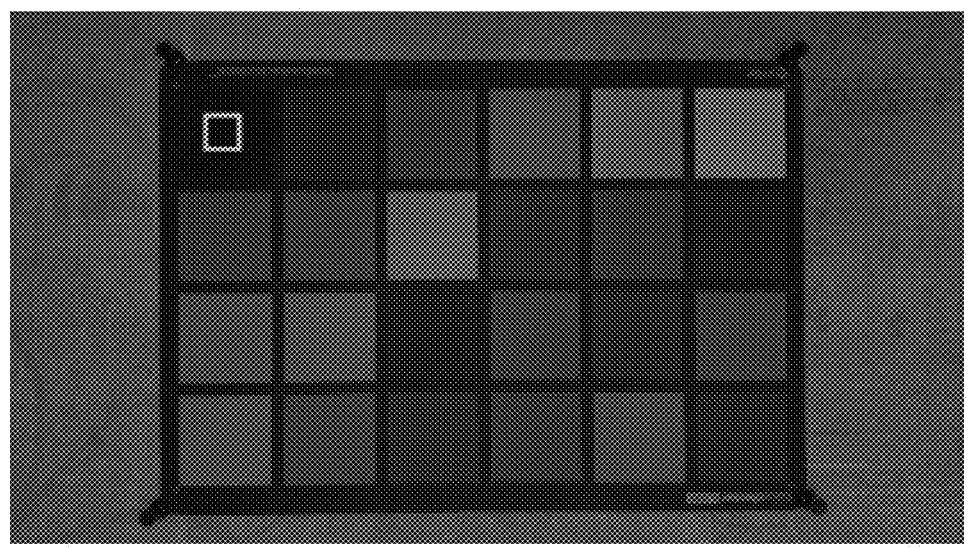
FIG. 1A is a noisy standard red, green, and blue (sRGB) image, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Recently deep-learning is being used for denoising real-world noisy image. However, dataset for these real-world noisy images is very limited and training a deep neural network using these datasets is very difficult. In the proposed method, raw sensor data is used along with the noisy RGB image to improve the performance of denoising method using our Y-shaped network. Adding the raw data along with RGB image may accomplish significant gains in performance over prior method with same network backbone.

There are plenty of deep learning-based methods for real-world noisy image denoising. New Trends in Image Restoration and Enhancement (NTIRE) 2019 and NTIRE 2020 image denoising challenge introduced Smartphone Image Denoising Dataset (SIDD) and SIDD+ datasets for real-world image denoising. Two of the best methods for these challenges were modified multi-level wavelet-residual channel attention (MWRCA) and deep iterative down-up convolutional neural network (DIDN). For our proposed network it is proposed to use MWRCA and DIDN as a network backbone and modified it to accept both raw and RGB images.

DIDN uses the U-Net architecture and modified the down-scaling and up-scaling layers for image denoising task. Instead of conventional pooling for down scaling and deconvolution for up scaling, DIDN uses convolution with stride 2 for down scaling and subpixel layers for up scaling.

MWRCA uses network based on multi-level wavelet convolutional network (MWCNN) and residual net (ResNet) architecture. It uses Discrete Wavelet Transform (DWT) and Inverse Wavelet Transform (IWT) as its downscaling and up scaling layer and replaces the convolution layer in each layer with residual group with channel attention in individual residual block.

In one or more embodiments, a noise analysis on the raw image and its corresponding image signal processor (ISP) processed RGB image and found out that the noise in RGB image is affected internal blocks of the ISP that mixes and amplifies the noise in the raw image. In the figure below, the absolute difference of the RGB and raw image of cropped image (Green box) in the left with respect to the ground truth image is computed. The noise distribution of the RGB image (solid line) is higher that the raw image (dotted line). The noise level using off-the-shelf Noise Level Estimation (NLE) method is computed and the NLE value for RGB image is much higher than the raw image. Both of these experiments suggest that the noise level is greatly affected mixing and amplification of noise by the ISP. Thus, a method to improve the denoising performance by adding the raw image as a n additional input in the denoising network is proposed.

FIG. TA shows a noise standard RGB (sRGB) image. A patch of size 256×256 is taken from the smooth region of the image shown by green box from both sRGB and corresponding raw image.

Figure 1B:
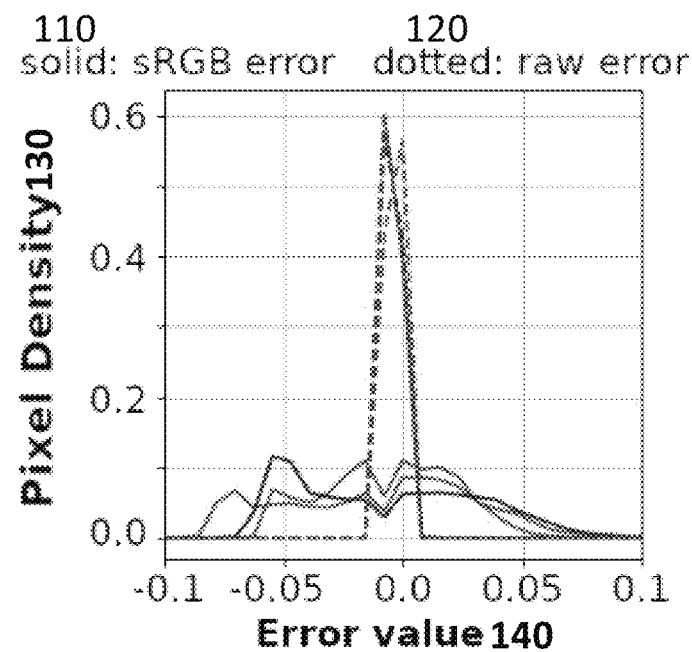
FIG. 1B is a histogram showing pixel level error, according to an example of the present disclosure.

FIG. 1B shows a noise comparison for noisy sRGB and noise raw image. Specifically, FIG. 1B shows a histogram showing the pixel level error between noisy and clean image. FIG. 1B shows noise comparison for noisy sRGB and noise ray image with respect to their ground truth images. FIG. 1B shows a 110 solid line: sRGB error, 120 dotted line for raw error, pixel density 130, and error value 140. That is, solid line 110 represents the error in the sRGB color space while the dotted line 120 represents the error in the raw color space.

Figure 2A:
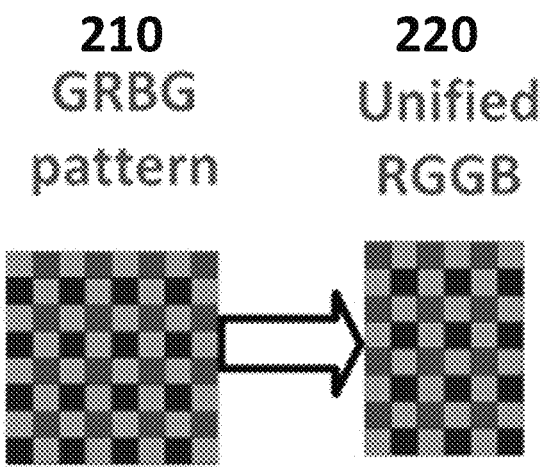
FIG. 2A is an illustration of a GRBG unification, according to an example of the present disclosure.

There are different types of Bayer's pattern: RGGB, BGGR, and GRBG pattern. Before sending it to the network sensor data is to be unified into single "RGGB" pattern. For training, the boundary pixels of raw data as form the "RGGB" pattern are cropped as shown in FIGS. 2A and 2C. and corresponding RGB to pixel-wise match the unified Bayer image. Then, this unified Bayer image and RGB image is transformed by flipping (horizontally and vertically) and/or transposing and finally cropped while still maintaining the "RGGB" pattern.

Figure 2B:
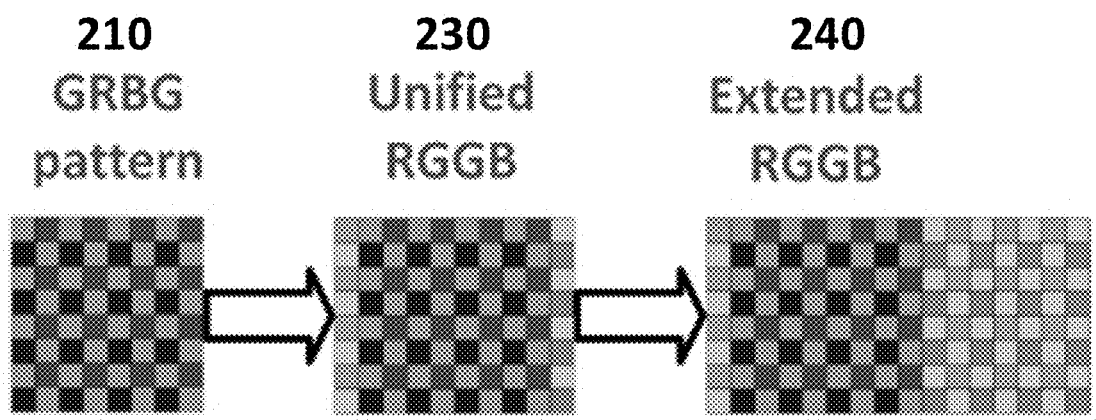
FIG. 2B is an illustration of a GRBG unification, according to an example of the present disclosure.
Figure 2C:
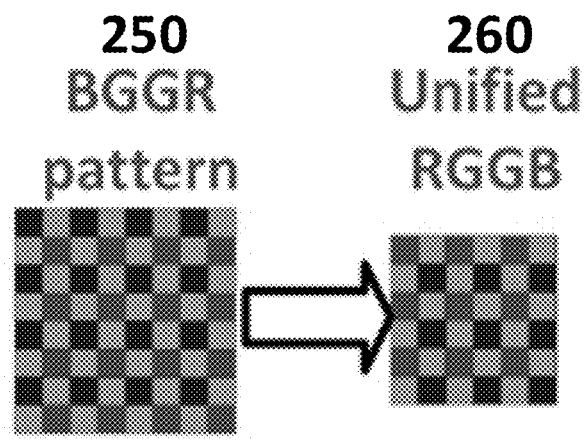
FIG. 2C is an illustration of BGGR unification, according to an example of the present disclosure.
Figure 2D:
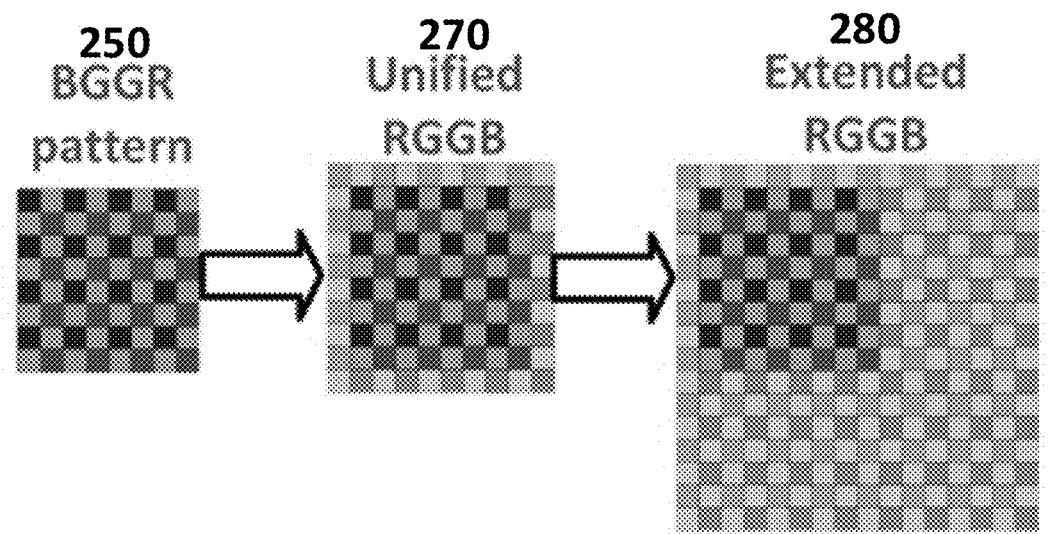
FIG. 2D is an illustration of BGGR unification, according to an example of the present disclosure.

While inference, instead of cropping the boundary pixels the pixel padding as seen in the FIGS. 2B and 2D to unify into "RGGB" pattern is used.

FIG. 2A shows a GRBG unification via cropping while training. Specifically, FIG. 2A shows 210 GRBG pattern and 220 Unified RGGB. GRBG is a Bayer pattern with green red blue and green colors.

FIG. 2B shows a GRBG unification via padding while testing. Specifically, FIG. 2B shows 210 GRBG pattern, 230 Unified RGGB, and 240 Extended RGGB. RGGB is a Bayer pattern with red, green, green, and blue colors.

FIG. 2C shows a BGGR unification via cropping while training. Specifically, FIG. 2C shows 250 BGGR pattern and 260 unified RGGB. BGGR is a Bayer pattern with blue, green, green, and red colors.

FIG. 2D shows a BGGR Unification via padding while testing. Specifically, FIG. 2C shows 250 BGGR pattern, 270 unified RGGB, and 280 extended RGGB.

The disclosure provides a Y-shaped network utilizing the current state of the art (SOTA) network as back-bone called MWRCA. The Y-shaped network uses the UNet like structure with discrete wavelet transform (DWT) to down scale and Inverse Wavelet Transform (IWT) to up scale the features. The overview of our Y-shape network is shown in FIG. 3. Y-MWRCA consist of two branch inputs, one for the RGB and other for the raw data. A single convolutional layer is use to extract the raw feature and concatenate with the down-scaled RGB feature.

Figures 3A, 3B:
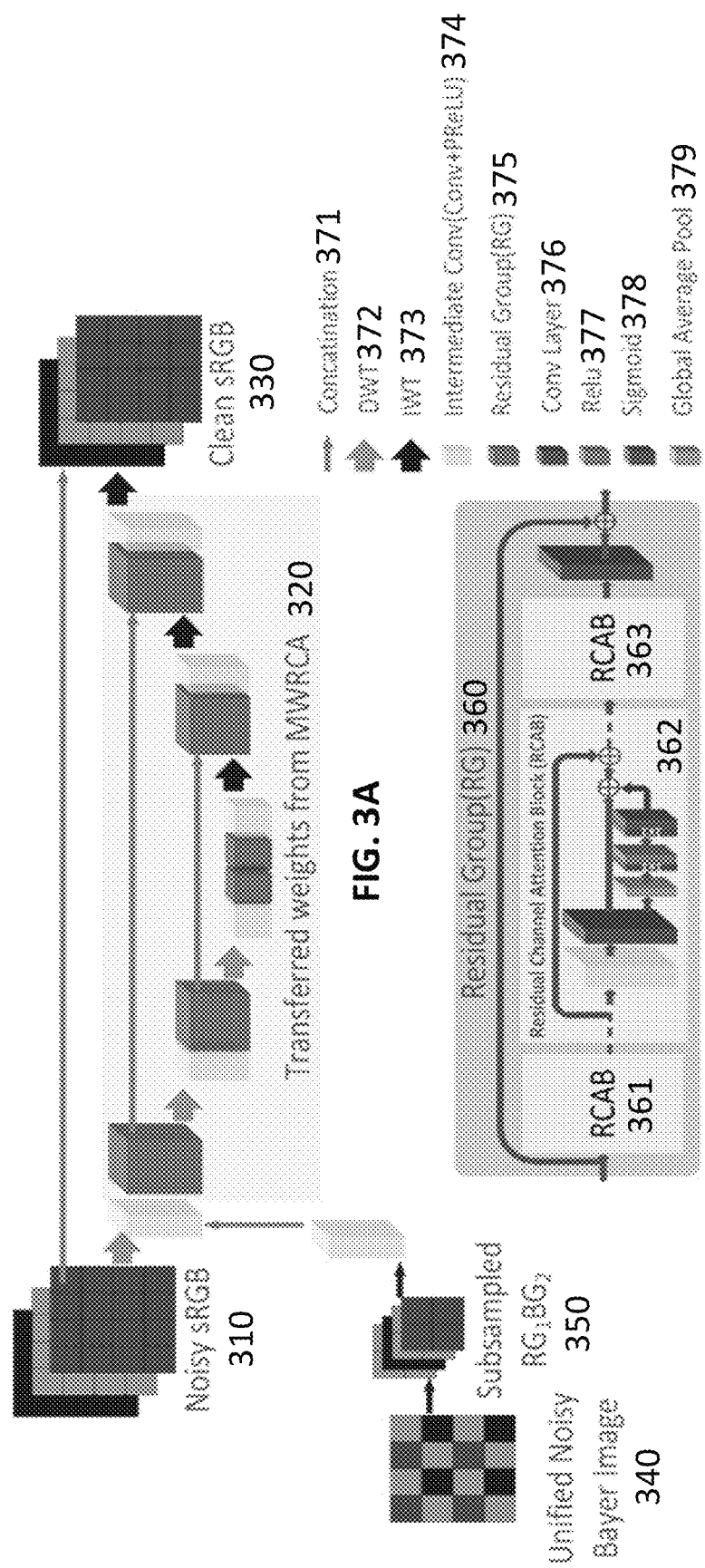
FIG. 3A is an illustration of a network architecture of Y modified multi-level wavelet-residual channel attention (MWRCA), according to an example of the present disclosure.
FIG. 3B is an illustration of a structure of residual group (RG), according to an example of the present disclosure.

FIG. 3A shows a network architecture of Y-MWRCA that includes two inputs in conjunction. Upper UNet-like module takes the noisy sRGB input whereas the lower feature extraction module extracts the raw features from subsampled noisy raw image and concatenates with the sRGB feature.

FIG. 3B shows a Structure of Residual Group (RG). Each RG consists of 16 Residual Channel Attention Block (RCAB). Specifically, FIGS. 3A and 3B show Noisy sRGB 310, transferred weights from MWRCA 320, clean sRGB 330, unified noisy bayer image 340, subsample $RG_1BG_2$ 350, residual group (RG) 360, RCAB 361, residual channel attention block (RCAB) 362, RCAB 363, concatenation 371, DWT 371, IWT 373, intermediate Conv (Conv+ PReLU) 374, residual group (RG) 375, conv layer 376, relu 377, sigmoid 378, and global average pool 379.

In one or more embodiments, it is proposed to train the network in two stages. First, it is proposed to train the RGB network separately and transferred the pretrained weights, except the first convolutional layers, as shown in the blue region to initialize the network parameters of the Y-MWRCA. Similarly, it is proposed to modify DIDN network to take an additional raw input as shown in FIG. 4.

Figure 4A:
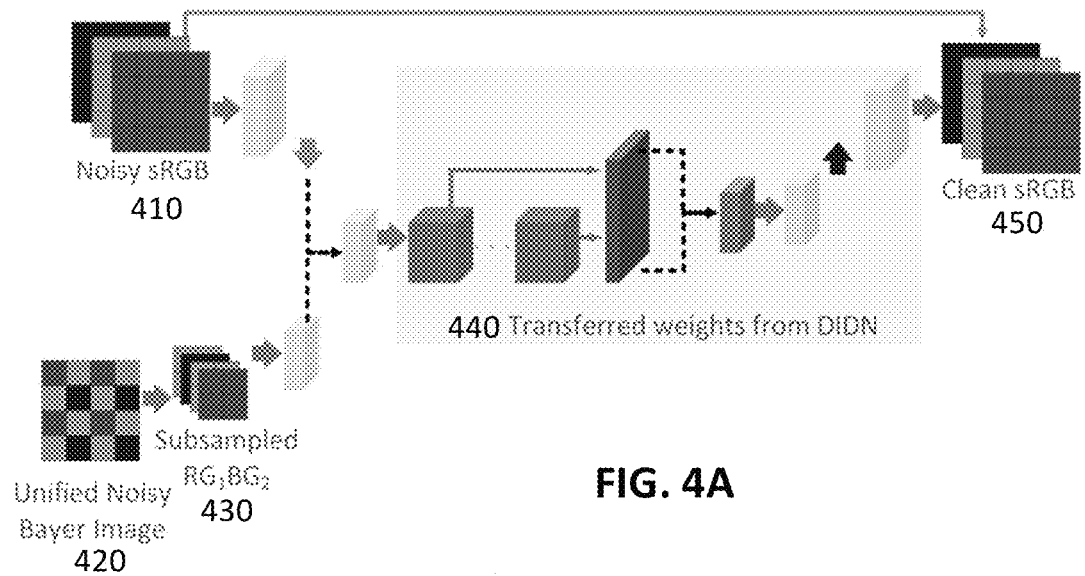
FIG. 4A is an illustration of an architecture of Y deep iterative down-up convolutional neural network (DIDN), according to an example of the present disclosure.

FIG. 4A shows Network architecture of Y-DIDN. Y-DIDN consists of two inputs in conjunction. Upper DIDN-like module takes the noisy sRGB input whereas the lower feature extraction module extracts the raw features from subsampled noisy raw image and concatenates with the sRGB feature.

Figure 4B:
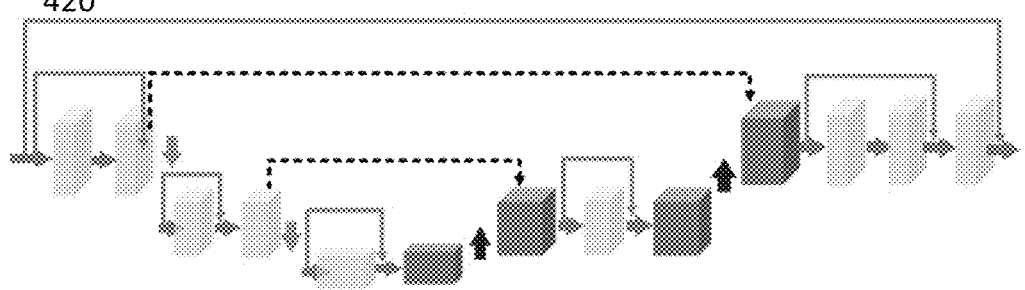
FIG. 4B is an illustration of a structure of Down-up block (DUB), according to an example of the present disclosure.

FIG. 4B shows Structure of Down-Up Block (DUB). Specifically, FIGS. 4A and 4B show Noisy sRGB, unified noisy bayer image 420, subsampled $RG_1BG_2$ 430, 440 transferred weights from DIDN, clean sRGB 450, adding 461, concatenation 463, 3×3 conv with stride of 2 463, subpixel layer with scale of 2 464, 3×3 Conv+PReLU 465, Down-up block (DUB) 466, reconstruction block 467, and 1×1 conv 468.

Prior knowledge of the noise present in the raw image which got mixed and magnified by the ISP.

Feature from raw has more information that help in better reconstruction of detail in the final image.

In one or more embodiments, it is proposed to fuse the raw and RGB feature at different levels making X-shaped network. This has shown to further improve the performance of the network.

Figure 5:
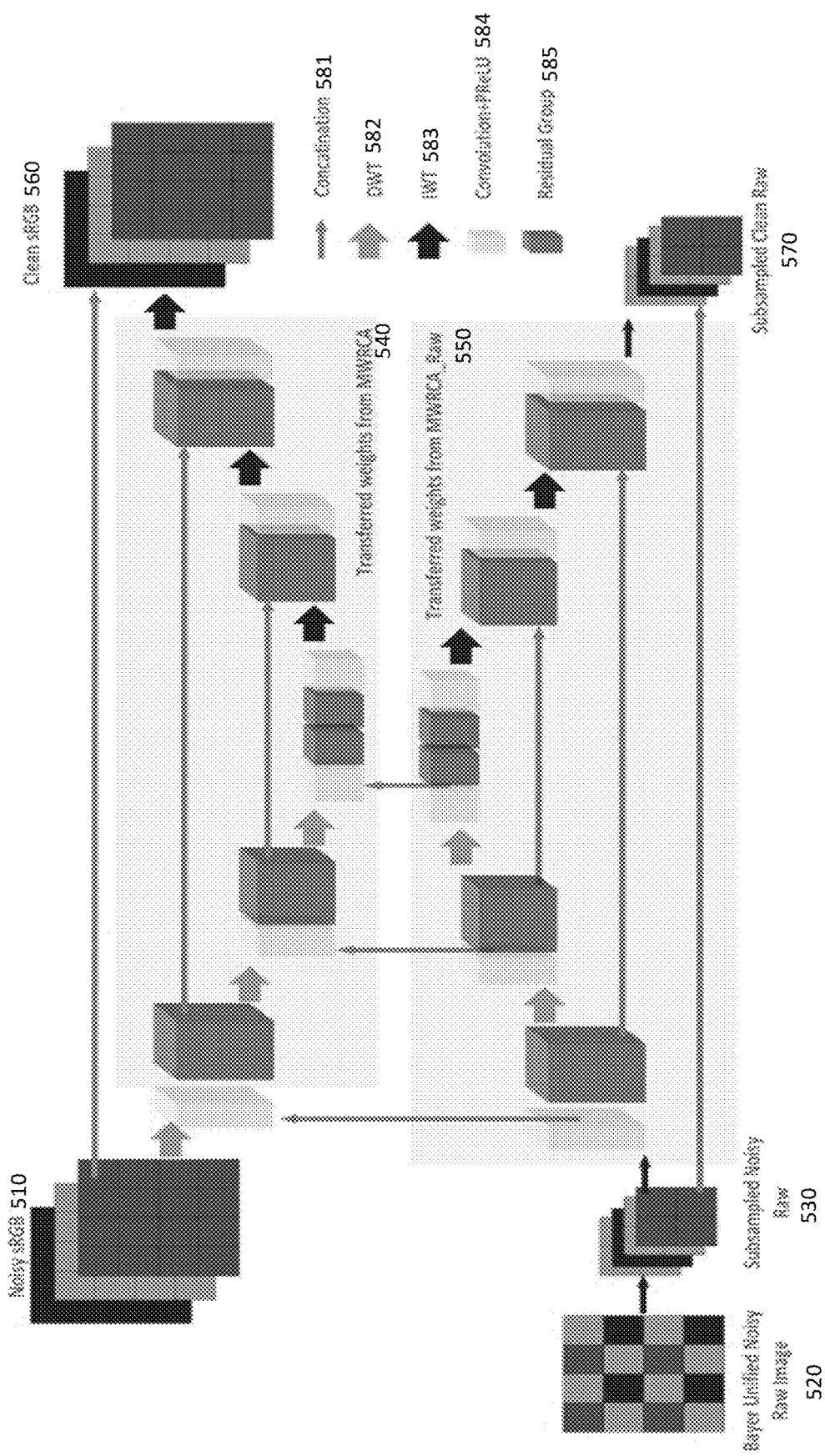
FIG. 5 is an illustration of a network architecture of X-Net, according to an example of the present disclosure.

FIG. 5 shows Network architecture of X-Net. MWRCA us use as the backbone of X-Net. Convolutional feature of raw image is concatenated at different level of RGB feature and is driven by two raw and RGB loss (dual loss). Specifically, FIG. 5 shows noisy sRGB 510, Bayer Unified Noisy raw image 520, subsampled noisy raw 530, transferred weights from MWRCA 540, transferred weights from MWRCA_Raw 550, clean sRGB 560, subsampled clean raw 570, concatenation 581, DWT 582, IWT 583, convolution+PReLU 584, and residual group 585.

In one or more embodiments, it is proposed to use additional noisy raw data to the network along the noisy RGB for real world image denoising. In an ISP when noisy raw image is converted to RGB image, the noise gets mixed and magnified in the final image. This makes it difficult to denoise the RGB image. Having the raw image input to the network helps by providing extra information to the network which is not present in RGB image.

In one or more embodiments, it is proposed to use a dual branch y-shape network architecture that takes both RGB and raw image as input for image denoising task. Y-shape network extracts the feature of both RGB and raw image and combine the feature to help for better denoising.

Figure 6:
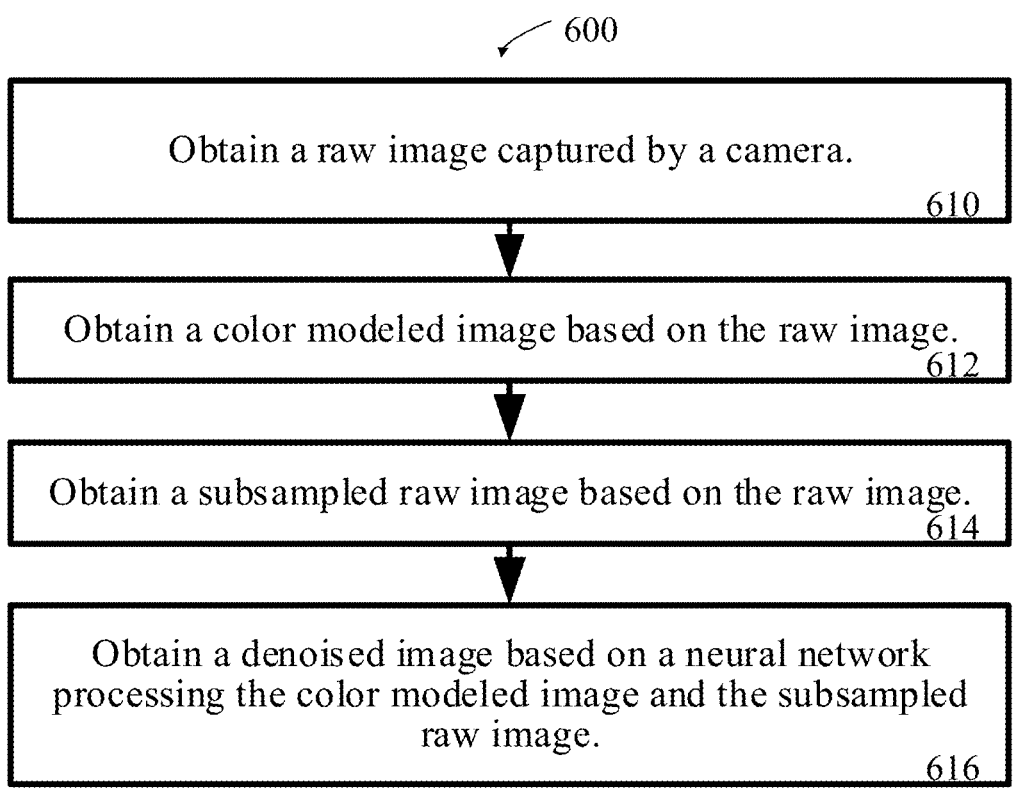
FIG. 6 is an illustration of a method for image denoising, according to an example of the present disclosure.

FIG. 6 shows a method for image denoising in accordance with the present disclosure. The method may be implemented by a device include one or more processors such as CPUs and/or GPUs. For example, the device may be a smart phone, a tablet, a smart glass, a computer, a server, or any other electronic device.

In step 610, the device obtains a raw image captured by a camera. The camera may be included as a part of the device. Alternatively or additionally, the camera may be wireless connected with the device.

In step 620, the device obtains a color modeled image based on the raw image. In one example, the color model may be an RGB model. The color model may include other models such as YUV color model, YCbCr color model, CMY color model, RGBA color model, CMYK color model, or other color models.

In step 630, the device obtains a subsampled raw image based on the raw image. In one example, the subsamples of the raw image may be based on a RGBG pattern. The subsamples may also be based on other patterns such as RGGB, BGGR, or GRBG pattern.

In step 640, the device obtains a denoised image based on a neural network processing the color modeled image and the subsampled raw image. The denoised image may be obtained by combining the color modeled image and the subsampled raw image and processing it using a neural network. For example, a neural network may extract features of both color modeled image and the subsampled raw image and combine the features to obtain a denoised image. In another example, the features extracted from both color modeled image and the subsampled raw image may be concatenated in stages based on level of frequencies.

Figure 7:
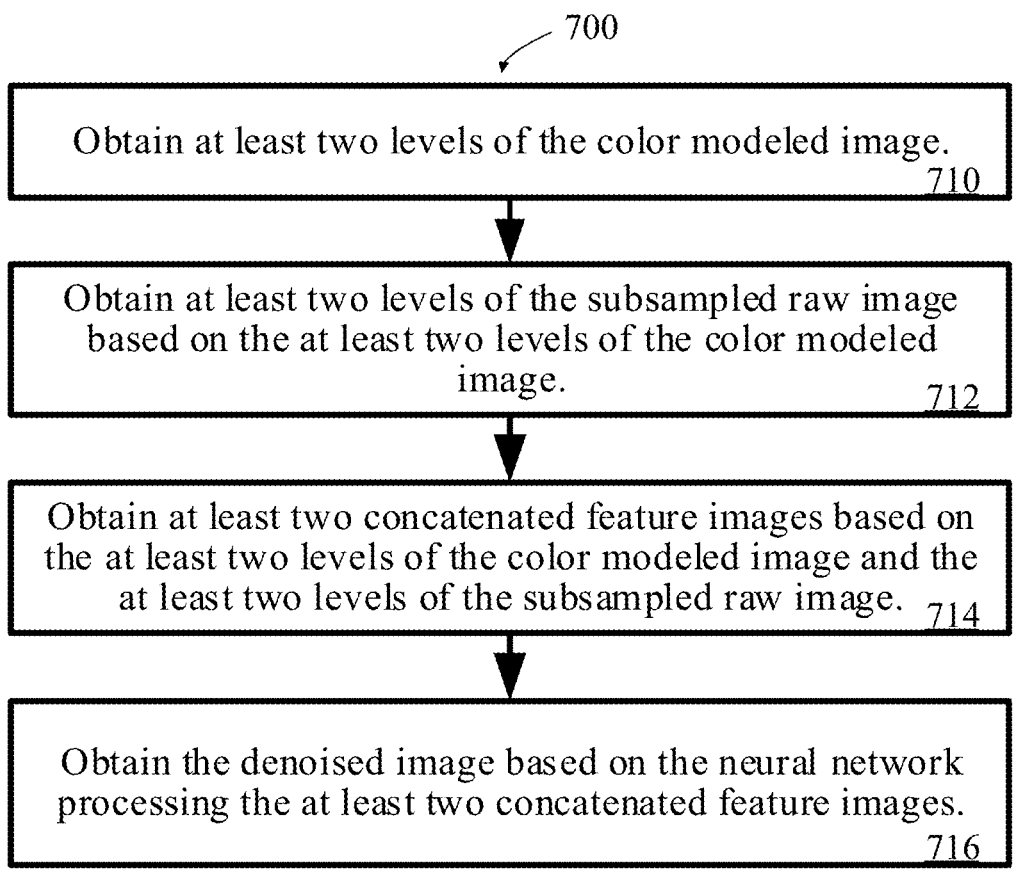
FIG. 7 is an illustration of a method for image denoising, according to an example of the present disclosure.

FIG. 7 shows a method for image denoising in accordance with the present disclosure. The method may be implemented by a device include one or more processors such as CPUs and/or GPUs.

In step 710, the device obtains at least two levels of the color modeled image. The at least two levels may include low level features and high level features.

In step 720, the device obtains at least two levels of the subsampled raw image based on the at least two levels of the color modeled image.

In step 730, the device obtains at least two concatenated feature images based on the at least two levels of the color modeled image and the at least two levels of the subsampled raw image.

In step 740, the device obtains the denoised image based on the neural network processing the at least two concatenated feature images.

Figure 8:
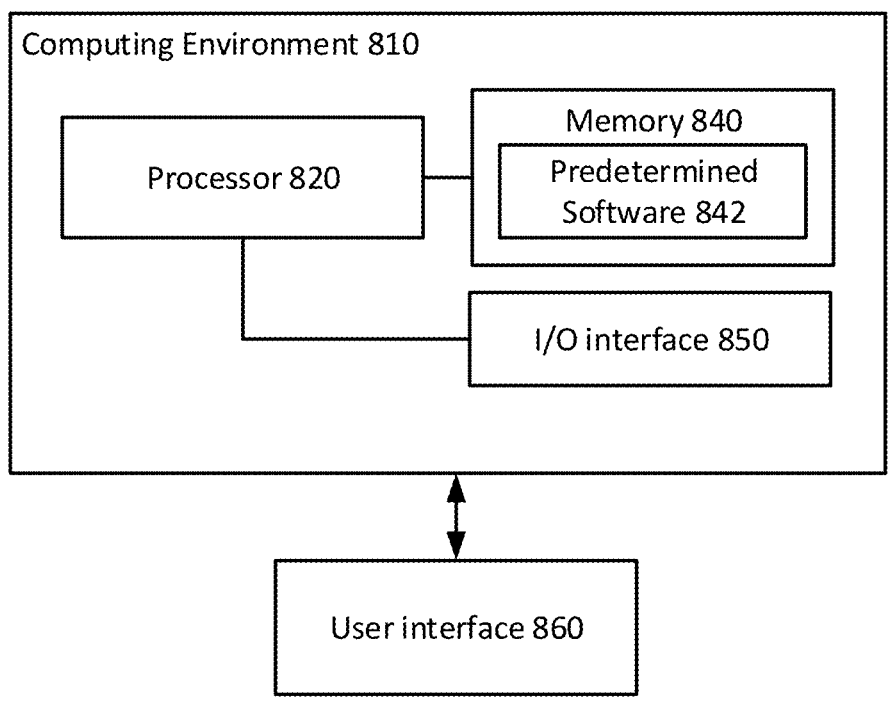
FIG. 8 is a diagram illustrating a computing environment coupled with a user interface, according to an example of the present disclosure.

FIG. 8 shows a computing environment 810 coupled with user interface 860. Computing environment 810 includes processor 820, graphics processing unit (GPU) 830, memory 840, and I/O interface 850.

The processing component 820 typically controls overall operations of the computing environment 810, such as the operations associated with display, data acquisition, data communications, and image processing. The processor 820 may include one or more processors to execute instructions to perform all or some of the steps in the above described methods. Moreover, the processor 820 may include one or more modules which facilitate the interaction between the processor 820 and other components. The processor may be a Central Processing Unit (CPU), a microprocessor, a single chip machine, a GPU, or the like. GPU 830 can include one or more GPUs interconnected to execute one or more GPU executable programs.

The memory 840 is configured to store various types of data to support the operation of the computing environment 810. Examples of such data comprise instructions for any applications or methods operated on the computing environment 810, image data, etc. The memory 840 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 850 provides an interface between the processor 820 and peripheral interface modules, such as a keyboard, a click wheel, buttons, and the like. The buttons may include, but are not limited to, a home button, a start scan button, and a stop scan button.

In an embodiment, the computing environment 810 may be implemented with one or more application specific integrated circuits (ASICs), digital signal processors (DSPs), digital signal processing devices (DSPDs), programmable logic devices (PLDs), field programmable gate arrays (FPGAs), graphical processing units (GPUs), controllers, micro-controllers, microprocessors, or other electronic components, for performing the above methods.

In an embodiment, there is also provided a non-transitory computer-readable storage medium comprising instructions, such as comprised in the memory 840, executable by the processor 820 in the computing environment 810, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 810 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for image denoising comprising:
obtaining a raw image captured by a camera;
obtaining a color modeled image based on the raw image;
obtaining a subsampled raw image based on the raw image; and
obtaining a denoised image based on a neural network processing the color modeled image and the subsampled raw image.

2. The method of claim 1, wherein the color modeled image comprises an RGB color model.

3. The method of claim 2, wherein the subsampled raw image is unified into an RGGB pattern.

4. The method of claim 1, wherein obtaining the denoised image based on the neural network processing the color modeled image and the subsampled raw image comprises:
obtaining a concatenated feature image based on the color modeled image and the subsampled raw image; and
obtaining the denoised image by using the neural network to process the concatenated feature image.

5. The method of claim 1, wherein obtaining the denoised image based on the neural network processing the color modeled image and the subsampled raw image comprises:
obtaining at least two levels of the color modeled image, wherein the at least two levels comprise low level features and high level features;
obtaining at least two levels of the subsampled raw image based on the at least two levels of the color modeled image;
obtaining at least two concatenated feature images based on the at least two levels of the color modeled image and the at least two levels of the subsampled raw image; and
obtaining the denoised image based on the neural network processing the at least two concatenated feature images.

6. The method of claim 1, wherein the neural network comprises modified multi-level wavelet-residual channel attention (MWRCA) and deep iterative down-up convolutional neural networks (DIDN) networks.

7. The method of claim 6, wherein the neural network uses pretrained weights.

8. A computing device comprising:
one or more processors coupled with a camera; and
a non-transitory computer-readable memory storing instructions executable by the one or more processors, wherein the one or more processors are configured to:
obtain a raw image captured by the camera;
obtain a color modeled image based on the raw image;
obtain a subsampled raw image based on the raw image; and
obtain a denoised image based on a neural network processing the color modeled image and the subsampled raw image.

9. The computing device of claim 8, wherein the color modeled image comprises an RGB color model.

10. The computing device of claim 9, wherein the subsampled raw image is unified into an RGGB pattern.

11. The computing device of claim 8, wherein the one or more processors configured to obtain the denoised image based on the neural network processing the color modeled image and the subsampled raw image are further configured to:
obtain a concatenated feature image based on the color modeled image and the subsampled raw image; and
obtain the denoised image based on the neural network processing the concatenated feature image.

12. The computing device of claim 8, the one or more processors configured to obtain the denoised image based on the neural network processing the color modeled image and the subsampled raw image are further configured to:
obtain at least two levels of the color modeled image, wherein the at least two levels comprise low level features and high level features;
obtain at least two levels of the subsampled raw image based on the at least two levels of the color modeled image;
obtain at least two concatenated feature images based on the at least two levels of the color modeled image and the at least two levels of the subsampled raw image; and
obtain the denoised image based on the neural network processing the at least two concatenated feature images.

13. The computing device of claim 8, wherein the neural network comprises modified multi-level wavelet-residual channel attention (MWRCA) and deep iterative down-up convolutional neural networks (DIDN) networks.

14. The computing device of claim 13, wherein the neural network uses pretrained weights.

15. A non-transitory computer-readable storage medium storing a plurality of programs for execution by a computing device having one or more processors, wherein the plurality of programs, when executed by the one or more processors, cause the computing device to perform acts comprising:
- obtaining a raw image captured by a camera;
- obtaining a color modeled image based on the raw image;
- obtaining a subsampled raw image based on the raw image; and
- obtaining a denoised image based on a neural network processing the color modeled image and the subsampled raw image.

16. The non-transitory computer-readable storage medium of claim 15, wherein the color modeled image comprises an RGB color model.

17. The non-transitory computer-readable storage medium of claim 16, wherein the subsampled raw image is unified into an RGGB pattern.

18. The non-transitory computer-readable storage medium of claim 15, wherein the plurality of programs further cause the computing device to perform:
- obtaining a concatenated feature image based on the color modeled image and the subsampled raw image; and
- obtaining the denoised image based on the neural network processing the concatenated feature image.

19. The non-transitory computer-readable storage medium of claim 15, wherein the plurality of programs further cause the computing device to perform:
- obtaining at least two levels of the color modeled image, wherein the at least two levels comprise low level features and high level features;
- obtaining at least two levels of the subsampled raw image based on the at least two levels of the color modeled image;
- obtaining at least two concatenated feature images based on the at least two levels of the color modeled image and the at least two levels of the subsampled raw image; and
- obtaining the denoised image based on the neural network processing the at least two concatenated feature images.

20. The non-transitory computer-readable storage medium of claim 15, wherein the neural network comprises modified multi-level wavelet-residual channel attention (MWRCA) and deep iterative down-up convolutional neural networks (DIDN) networks.

21. The non-transitory computer-readable storage medium of claim 20, wherein the neural network uses pretrained weights.

* * * * *